United States Patent
Ishikawa (10) Patent No.: US 11,971,139 B2
(45) Date of Patent: Apr. 30, 2024

(54) HIGH-PRESSURE TANK AND MANUFACTURING METHOD OF THE SAME

(71) Applicant: HONDA MOTOR CO., LTD., Tokyo (JP)

(72) Inventor: Yusuke Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 17/824,943

(22) Filed: May 26, 2022

(65) Prior Publication Data

US 2022/0390068 A1 Dec. 8, 2022

(30) Foreign Application Priority Data

Jun. 8, 2021 (JP) .................................. 2021-095977

(51) Int. Cl.
*F17C 1/04* (2006.01)

(52) U.S. Cl.
CPC ........ *F17C 1/04* (2013.01); *F17C 2201/0109* (2013.01); *F17C 2203/0604* (2013.01); *F17C 2203/066* (2013.01); *F17C 2205/0305* (2013.01); *F17C 2209/236* (2013.01)

(58) Field of Classification Search
CPC ............... F17C 1/04; F17C 2201/0109; F17C 2203/0604; F17C 2203/066; F17C 2205/0305; F17C 2209/236
USPC ........................................ 220/582, 601, 661
See application file for complete search history.

(56) References Cited

U.S. PATENT DOCUMENTS

| 5,979,692 | A | * | 11/1999 | West | F17C 1/16 220/601 |
| 2014/0103051 | A1 | * | 4/2014 | Kanezaki | F17C 13/002 220/587 |
| 2016/0025266 | A1 | * | 1/2016 | Leavitt | F17C 1/16 206/0.6 |
| 2017/0268725 | A1 | * | 9/2017 | Yeggy | F17C 1/14 |
| 2017/0292651 | A1 | * | 10/2017 | Newhouse | F17C 13/002 |
| 2019/0257474 | A1 | * | 8/2019 | Kanezaki | F17C 1/06 |

FOREIGN PATENT DOCUMENTS

JP 2019-143722 8/2019

* cited by examiner

*Primary Examiner* — John K Fristoe, Jr.
*Assistant Examiner* — Laura E. Parker
(74) *Attorney, Agent, or Firm* — Amin, Turocy & Watson, LLP (57) ABSTRACT

This high-pressure tank includes a resin liner constituting a hollow fluid filling part, a ferrule including a supply/discharge port which communicates with an internal space of the liner and a flange part which protrudes outward in a radial direction from a circumferential region of the supply/discharge port and abuts on the liner, and a reinforcing layer made of a fiber reinforced resin attached to cover across the liner and an outer circumferential surface of the flange part, in which a discharge hole allowing a gap between abutting surfaces of the flange part and the liner to communicate with an inside of the supply/discharge port and discharging a fluid accumulated between the liner and the reinforcing layer to the supply/discharge port is provided in the ferrule, and a trap groove surrounding a circumferential region of the discharge hole is provided on at least any one of the abutting surface on the flange part side and the abutting surface on the liner side.

2 Claims, 7 Drawing Sheets

HIGH-PRESSURE TANK AND MANUFACTURING METHOD OF THE SAME

CROSS-REFERENCE TO RELATED APPLICATION

The present application claims priority based on Japanese Patent Application No. 2021-095977, filed Jun. 8, 2021, the content of which is incorporated herein by reference.

BACKGROUND OF THE INVENTION

Field of the Invention

The present invention relates to a high-pressure tank into which a high-pressure fluid is filled and a manufacturing method of the same.

Description of Related Art

As a high-pressure tank into which a high-pressure fluid such as a gas or a liquid is filled, there is one in which a main part is formed of a resin material.

Most of high-pressure tanks of this type include a resin liner constituting a hollow fluid filling part, a ferrule attached to the liner, and a reinforcing layer made of a fiber reinforced resin attached to cover across an outer circumferential surface of the liner and a part of the ferrule. The ferrule includes a supply/discharge port that communicates with an internal space of the liner, and a flange part that protrudes outward in a radial direction from a circumferential region of the supply/discharge port. In the ferrule, the flange part abuts on an end surface of the liner on the ferrule side, and in that state, the supply/discharge port is connected to an opening of the liner. In the reinforcing layer, reinforced fibers impregnated with a base resin are attached to cover across the liner and an outer circumferential surface of the flange part, and then the base resin is subjected to a cure treatment by heating or the like.

Incidentally, when a fluid to be filled into the high-pressure tank is a gas, a resin liner tends to allow the gas to pass therethrough more easily than a metal liner made of an aluminum alloy or the like. Therefore, when a gas is filled in at a high pressure, it is conceivable that the gas pass through the liner and accumulate between an outer surface of the liner and the reinforcing layer. When the gas is discharged from the inside of the liner in this state, it is conceivable that an internal pressure of the liner become lower than a pressure of a gap between the outer surface of the liner and the reinforcing layer. In this case, there is a likelihood of causing so-called buckling in which the gap between the liner and the reinforcing layer is extended and a part of a circumferential wall of the liner bulges toward the inside.

As a countermeasure for this, there is one in which a discharge hole allowing abutting surfaces (minute abutting gap) of the flange part and the liner to communicate with the inside of the supply/discharge port is provided in the ferrule, and a fluid (gas) accumulated between the liner and the reinforcing layer is discharged to the supply/discharge port through the discharge hole.

In a case of this countermeasure, the discharge hole of the ferrule communicates with the abutting surfaces (minute abutting gap) of the flange part and the liner, but the reinforcing layer made of a fiber reinforced resin is attached on an outer circumferential side of the abutting surfaces of the flange part and the liner to cover across the liner and an outer circumferential surface of the flange part. Therefore, when reinforced fibers impregnated with the base resin are attached to cover the liner and the outer circumferential surface of the flange part during manufacture of the high-pressure tank, there is concern that the base resin in a liquid state before curing may enter the abutting gap between the flange part and the liner and the base resin may flow into the discharge hole. When the base resin is cured in the discharge hole, malfunction will be caused in the discharge hole and a fluid (gas) that has flowed into the gap between the liner and the reinforcing layer cannot be smoothly discharged to the outside.

For this reason, a high-pressure tank in which a base resin does not enter the abutting gap between the flange part and the liner during manufacturing has been devised (see, for example, Japanese Unexamined Patent Application, First Publication No. 2019-143722).

The high-pressure tank described in Japanese Unexamined Patent Application, First Publication No. 2019-143722 has a structure in which a coating layer that repels a base resin in a liquid state is provided at an abutting portion between the flange part and the liner so that the base resin in a liquid state can be prevented from flowing into the discharge hole during manufacturing.

SUMMARY OF THE INVENTION

Since the high-pressure tank described in Japanese Unexamined Patent Application, First Publication No. 2019-143722 is configured to repel a base resin in a liquid state by the coating layer provided at the abutting portion between the flange part and the liner, when a gap between the flange part and the liner is not sufficiently small, it is difficult to reliably suppress an inflow of the base resin into the discharge hole. Therefore, although the gap between the flange part and the liner needs to be sufficiently reduced, when an attempt is made to manufacture a ferrule and a liner with high accuracy, product costs will increase. Therefore, it is desired to devise a simple structure in which a base resin flowing into the discharge hole can be reliably prevented during manufacturing.

An objective of an aspect of the present invention is to provide a high-pressure tank in which a base resin flowing into the discharge hole can be reliably prevented during manufacturing, and a manufacturing method of the same.

In order to achieve the above-described objective, a high-pressure tank and a manufacturing method of a high-pressure tank according to an aspect of the present invention employ the following configuration.

(1) A first aspect of the present invention is a high-pressure tank including a resin liner (for example, a liner 10 of the embodiment) constituting a hollow fluid filling part, a ferrule (for example, a ferrule 12 of the embodiment) including a supply/discharge port (for example, a supply/discharge port 11 of the embodiment) which communicates with an internal space of the liner and a flange part (for example, a flange part 12b of the embodiment) which protrudes outward in a radial direction from a circumferential region of the supply/discharge port and abuts on the liner, and a reinforcing layer (for example, a reinforcing layer 13 of the embodiment) made of a fiber reinforced resin attached to cover across the liner and an outer circumferential surface of the flange part, in which a discharge hole (for example, a discharge hole 17 of the embodiment) allowing a gap between abutting surfaces (for example, abutting surfaces 12bs and 14s of the embodiment) of the flange part and the liner to communicate with an inside of the supply/ discharge port and discharging a fluid accumulated between the liner and the reinforcing layer to the supply/discharge port is provided in the ferrule, and a trap groove (for example, a trap groove 19 of the embodiment) surrounding a circumferential region of the discharge hole is provided on at least any one of the abutting surface on the flange part side and the abutting surface on the liner side.

According to the aspect (1) described above, when a fluid that has been filled into the fluid filling part of the liner passes through the liner and flows into a gap between the liner and the reinforcing layer in use of the high-pressure tank, the fluid is returned from the discharge hole to the supply/discharge port of the ferrule through the abutting portion between the flange part of the ferrule and the liner.

Also, when the high-pressure tank is manufactured, the ferrule is assembled to the liner, and reinforced fibers impregnated with the base resin are attached to cover the liner and the outer circumferential surface of the flange part of the ferrule. Thereafter, when the base resin impregnated in the reinforced fibers is cured, the liner and the outer circumferential surface of the flange part are covered with the reinforcing layer. Here, when the reinforced fibers are attached to cover the liner and the outer circumferential surface of the flange part of the ferrule, or in a stage before the base resin is completely cured, the base resin in a liquid state may flow into the gap between the abutting surfaces of the flange part and the liner. At this time, the base resin that has flowed in is trapped by the trap groove and is prevented from flowing into the discharge hole.

(2) In the aspect (1) described above, a protruding part (for example, a protruding part 20 of the embodiment) may be formed on any one of the abutting surfaces of the flange part and the liner to surround the circumferential region of the discharge hole on an inner side of the trap groove and press against the any other of the abutting surfaces.

According to the aspect (2) described above, when the base resin of the reinforcing layer in a liquid state has flowed into the gap between the abutting surfaces of the flange part and the liner during manufacture of the high-pressure tank, a resin that has not been trapped by the trap groove can be prevented from flowing into the discharge hole side by the protruding part. Therefore, the base resin flowing into the discharge hole can be doubly prevented by the trap groove and the protruding part.

(3) In the aspect (1) described above, a communication hole (for example, a communication hole 21 of the embodiment) allowing the trap groove to communicate with an outside of the ferrule may be formed in the ferrule.

According to the aspect (3) described above, since the trap groove is open to the atmosphere through the communication hole during manufacture of the high-pressure tank, when the base resin of the reinforcing layer in a liquid state flows into the gap between the abutting surfaces of the flange part and the liner, the base resin smoothly flows into the trap groove. Therefore, when the present configuration is employed, the base resin flowing into the discharge hole can be more reliably prevented.

Also, when the high-pressure tank is manufactured, a space portion that is not completely filled with the base resin may remain in the trap groove. In this case, a filler can be filled into the space portion in the trap groove from the outside of the ferrule through the communication hole. When the filler is filled into the space portion of the trap groove in this way, it is possible to prevent the liner from being deformed to enter the space portion of the trap groove by receiving a high pressure of the fluid therein in use of the high-pressure tank. Therefore, when the present configuration is employed, deterioration of the liner can be prevented beforehand, and durability of the high-pressure tank can be enhanced.

(4) A second aspect of the present invention is a manufacturing method of a high-pressure tank which is a method of manufacturing a high-pressure tank including a resin liner constituting a hollow fluid filling part, a ferrule including a supply/discharge port which communicates with an internal space of the liner and a flange part which protrudes outward in a radial direction from a circumferential region of the supply/discharge port and abuts on the liner, and a reinforcing layer made of a fiber reinforced resin attached to cover across the liner and an outer circumferential surface of the flange part, and the manufacturing method of a high-pressure tank includes a step of forming a discharge hole which allows an abutting surface of the flange part with respect to the liner to communicate with an inside of the supply/discharge port in the ferrule, a step of forming a trap groove which surrounds a circumferential region of the discharge hole on at least any one of the abutting surface on the flange part side and the abutting surface on the liner side, a step of assembling the ferrule to the liner, a step of attaching reinforced fibers impregnated with a base resin to cover the liner and the outer circumferential surface of the flange part of the ferrule, and a step of obtaining the reinforcing layer by curing the base resin.

(5) The aspect (4) described above may further include a step of forming a communication hole which allows the trap groove to communicate with an outside of the ferrule in the ferrule before the ferrule is assembled to the liner, and a step of filling a filler into the trap groove through the communication hole.

According to the first aspect of the present invention, since the trap groove surrounding a circumferential region of the discharge hole is provided on at least one of the abutting surface of the ferrule on the flange part side and the abutting surface on the liner side, the base resin in a liquid state can be trapped by the trap groove, and the base resin can be reliably prevented from flowing into the discharge hole during manufacturing.

In addition, according to the second aspect of the present invention, the first aspect of the present invention can be easily formed.

DESCRIPTION OF EMBODIMENTS

Embodiments of the present invention will be described with reference to the drawings. Further, in the embodiments described below, portions the same as each other will be denoted by the same reference signs, and some duplicate description will be omitted.

Figure 1:
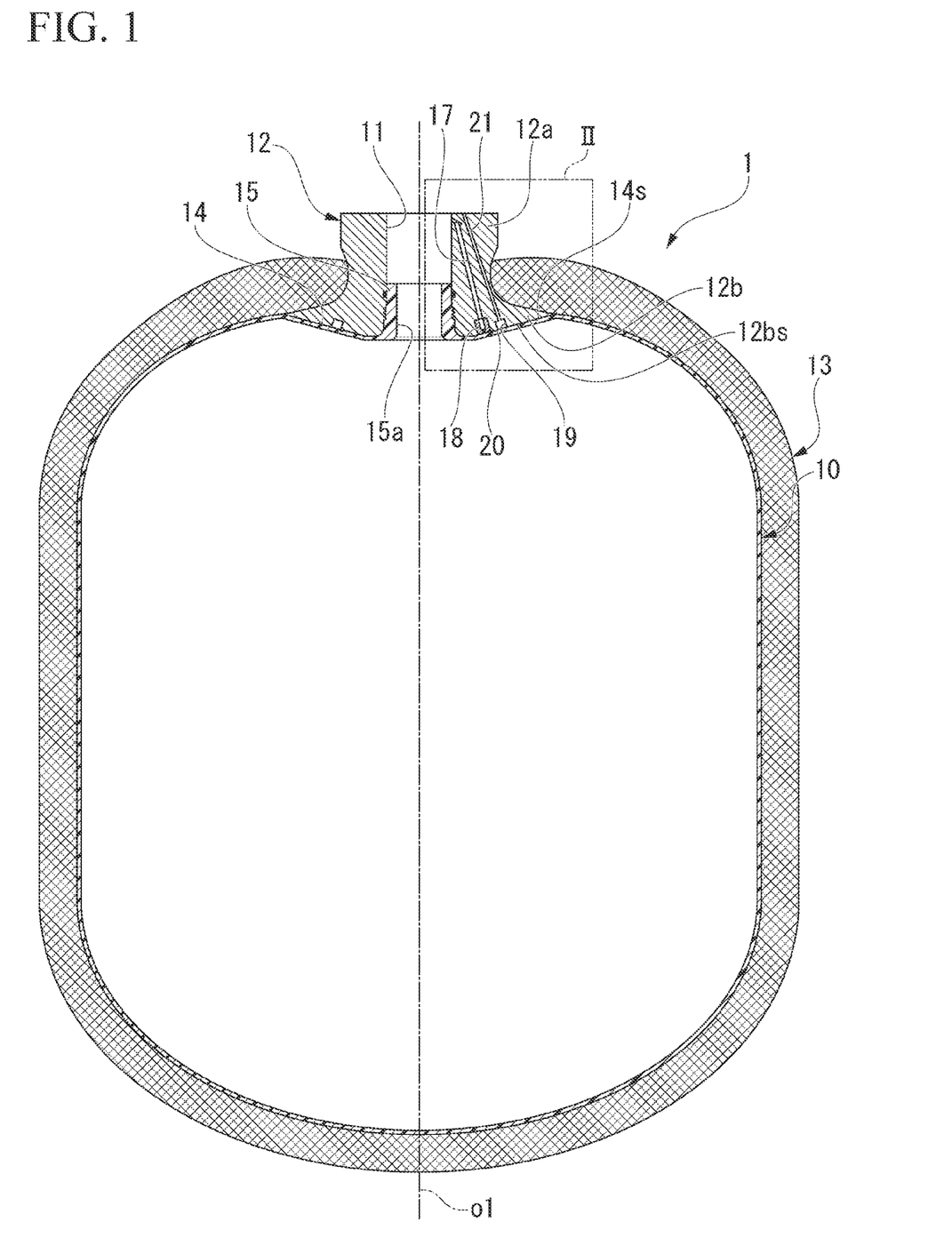
FIG. 1 is a cross-sectional view of the high-pressure tank of an embodiment in an axial direction.
Figure 2:
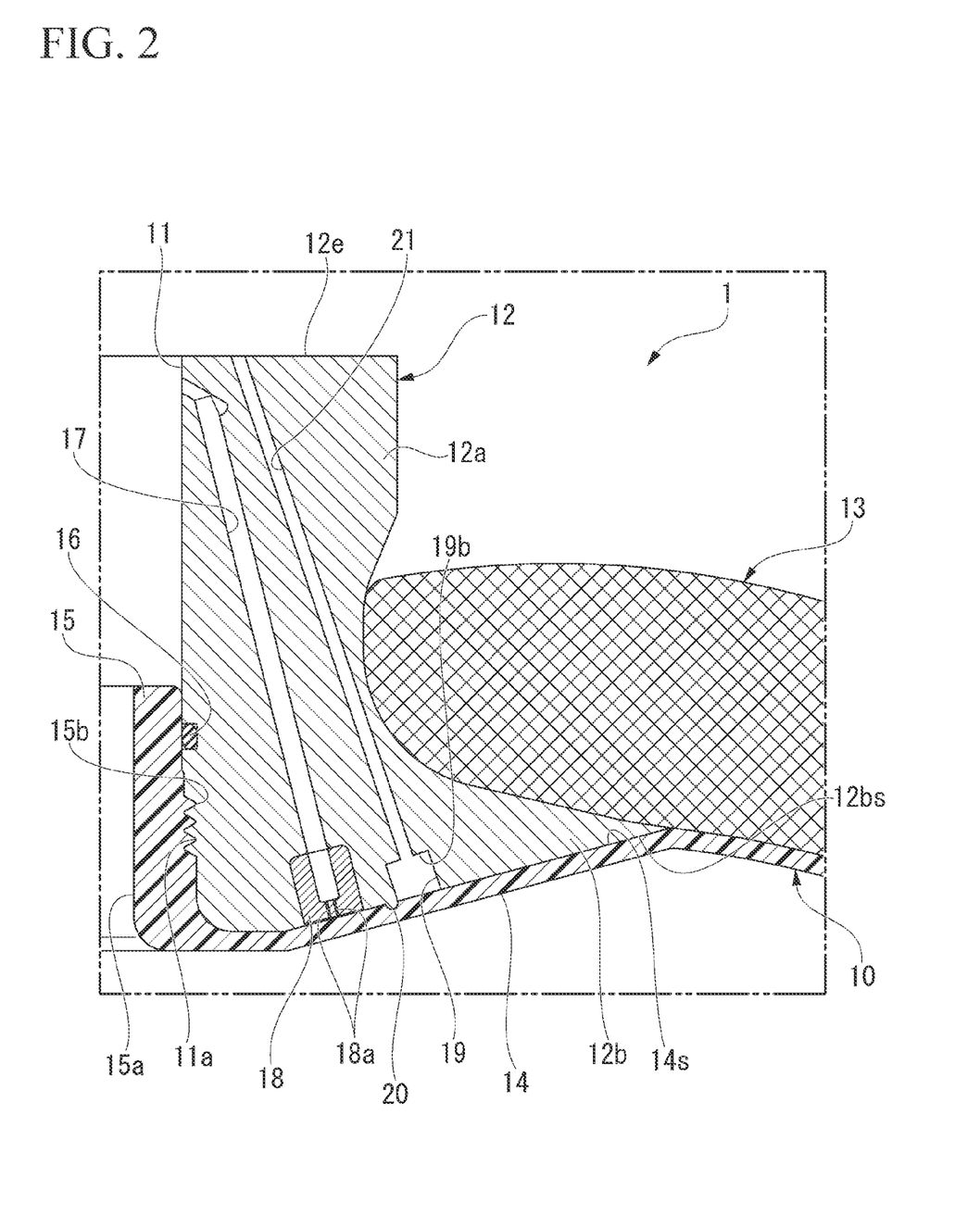
FIG. 2 is an enlarged cross-sectional view of part II of FIG. 1.
Figure 3:
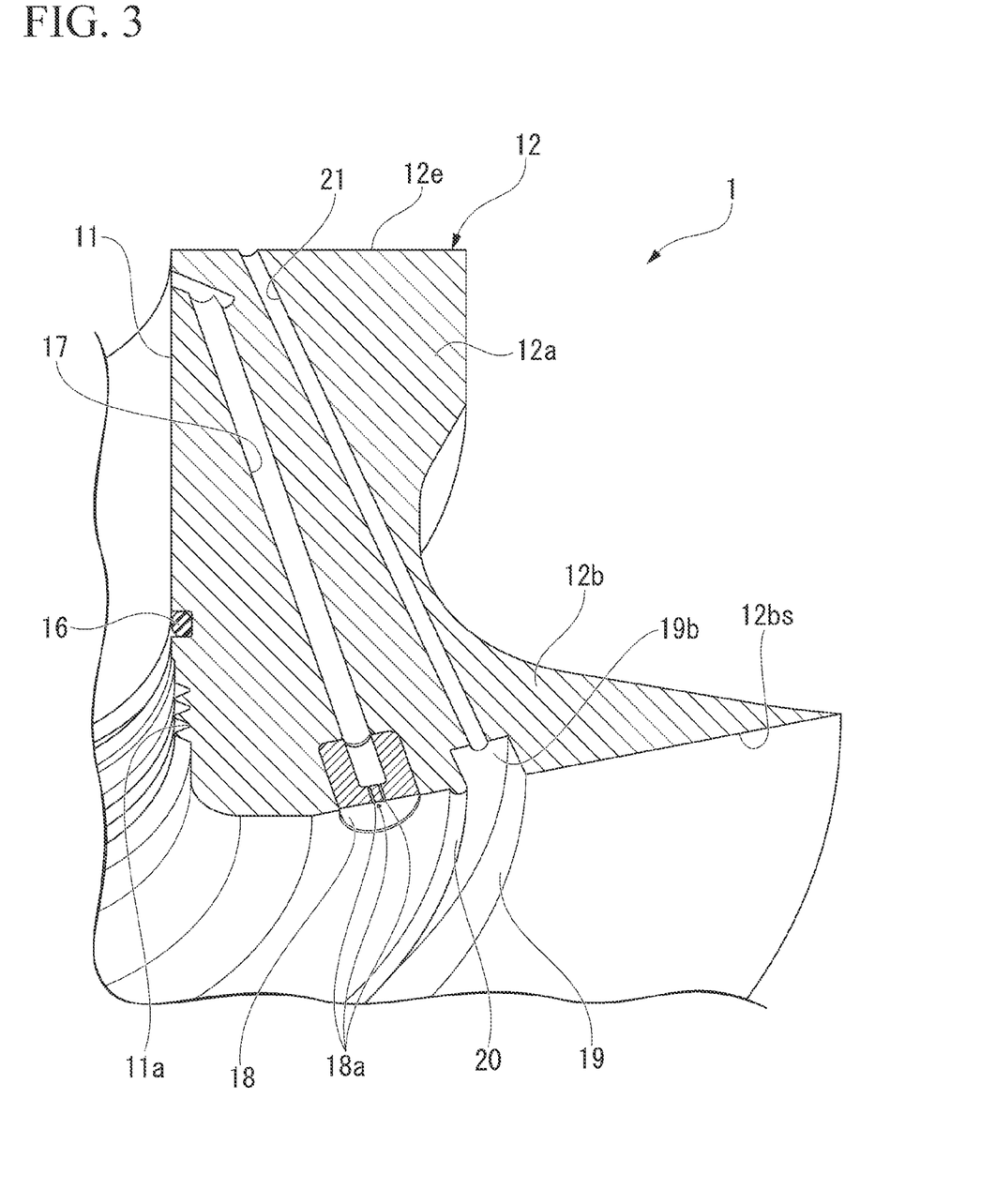
FIG. 3 is a partial cross-sectional perspective view of a ferrule corresponding to the part II of FIG. 1.

FIG. 1 is a cross-sectional view of a high-pressure tank 1 of the present embodiment in an axis o1 direction. FIG. 2 is an enlarged cross-sectional view of part II of FIG. 1 of the high-pressure tank 1, and FIG. 3 is a partial cross-sectional perspective view of a portion of a ferrule 12 corresponding to the part II of FIG. 1.

The high-pressure tank 1 includes a resin liner 10 constituting a hollow fluid filling part, the ferrule 12 having a supply/discharge port 11 that communicates with an internal space of the liner 10, and a reinforcing layer 13 made of a fiber reinforced resin that is attached to cover across an outer surface of the liner 10 and a part of the ferrule 12. The liner 10 constitutes an inner layer of a tank main body, and the reinforcing layer 13 constitutes an outer layer of the tank main body.

The liner 10 is formed of a resin hollow body having a substantially elliptical longitudinal section. The liner 10 is formed of a rotating body with the axis o1 as a rotation center. The inside of the liner 10 is filled with fluids of various types such as, for example, hydrogen gas in a state of high pressure. In the following, the inside of the liner 10 will be described as being filled with a gas in a state of high pressure.

A recessed part 14 recessed in a direction toward the inside of the hollow body is provided on one end side of the liner 10 in the axis o1 direction, and a cylindrical connecting cylindrical part 15 is integrally formed at a central portion of the recessed part 14. The connecting cylindrical part 15 protrudes in an outward direction of the hollow body along the axis o1. An opening 15a for allowing the inside of the hollow part of the liner 10 to communicate with the outside is formed in the connecting cylindrical part 15. Also, a male thread part 15b is formed on an outer circumferential surface of the connecting cylindrical part 15.

Hereinafter, for convenience of explanation, a direction in which the axis o1 of the liner 10 extends is referred to as "axial direction," and a direction perpendicular to the axis o1 is referred to as "radial direction."

The ferrule 12 includes a cylindrical ferrule main body part 12a and a flange part 12b that protrudes outward in the radial direction from an end portion of the ferrule main body part 12a on the liner 10 side. The supply/discharge port 11 is formed to penetrate the ferrule main body part 12a and the flange part 12b in the axial direction. A female thread 11a is cut on an inner circumferential edge portion of the supply/discharge port 11 close to the liner 10. The connecting cylindrical part 15 of the liner 10 is fitted in the supply/discharge port 11 of the ferrule 12. The ferrule 12 is connected to the liner 10 by fastening the male thread part 15b of the connecting cylindrical part 15 on the liner 10 side to the female thread 11a in the supply/discharge port 11. As illustrated in FIGS. 2 and 3, an annular seal member 16 is interposed between the connecting cylindrical part 15 and the supply/discharge port 11. A space between the connecting cylindrical part 15 and the supply/discharge port 11 is hermetically sealed by the seal member 16. In the high-pressure tank 1, filling of a gas into the liner 10 and discharge of a gas from the inside of the liner 10 (supply of the gas to the outside) are performed through the ferrule 12.

Further, in the present specification, the flange part 12b means a region of the ferrule 12 that protrudes radially outward from a circumferential region of the supply/discharge port 11 at the end portion of the ferrule 12 on the liner 10 side.

The flange part 12b of the ferrule 12 abuts on an outer surface side of the recessed part 14 of the liner 10. A surface (hereinafter referred to as "abutting surface 12bs") of the flange part 12b that abuts on the outer surface of the recessed part 14 of the liner 10 has a curved surface shape that matches the outer surface of the recessed part 14. A surface (an outer surface of the recessed part 14) of the liner 10 on which the abutting surface 12bs of the flange part 12b is abutted is hereinafter referred to as "abutting surface 14s."

Also, a discharge hole 17 that allows a gap (abutting gap) between the abutting surfaces 12bs and 14s of the flange part 12b and the liner 10 to communicate with the inside of the supply/discharge port 11 (outer region of a connection part with the connecting cylindrical part 15) is formed in the ferrule 12. An end portion of the discharge hole 17 on the abutting surface 12bs side is disposed in a region of the flange part 12b close to the supply/discharge port 11 (almost an extension region of the ferrule main body part 12a in the axial direction). The discharge hole 17 discharges a gas accumulated between the liner 10 and the reinforcing layer 13 (a gas that has passed through a wall of the liner 10 from the inside of the liner 10) into the supply/discharge port 11 of the ferrule 12. A columnar plug 18 made of a metal having a plurality of minute communication holes 18a is attached to the end portion of the discharge hole 17 on the abutting surface 12bs side. The gas accumulated between the liner 10 and the reinforcing layer 13 flows out to the discharge hole 17 through the gap between the abutting surfaces 12bs and 14s of the flange part 12b and the liner 10 and the communication holes 18a of the plug 18.

An annular trap groove 19 that surrounds a circumferential region of the end portion of the discharge hole 17 is formed on the abutting surface 12bs of the flange part 12b. In the case of the present embodiment, the trap groove 19 has a cross section formed in substantially a rectangular shape, and the rectangular cross section is formed on the abutting surface 12bs of the flange part 12b to draw a circular shape with the axis o1 as a center. The end portion of the discharge hole 17 on the abutting surface 12bs side is positioned on an inner side of the circular shape drawn in the cross section of the trap groove 19.

Further, in the present embodiment, the trap groove 19 is formed on the abutting surface 12bs of the flange part 12b, but the trap groove 19 may be formed on the abutting surface 14s on the liner 10 side. Also, the trap groove 19 may be formed on both the abutting surface 12bs on the flange part 12b side and the abutting surface 14s on the liner 10 side.

Also, a semicircular protruding part 20 is formed to surround the circumferential region of the end portion of the discharge hole 17 at an edge portion of the abutting surface 12bs of the flange part 12b on an inner side in a radial direction of the trap groove 19. Similarly to the trap groove 19, the protruding part 20 is formed on the abutting surface 12bs of the flange part 12b to draw a circular shape with the axis o1 as a center. The protruding part 20 is configured to press against the abutting surface 14s on the liner 10 side when the ferrule 12 is attached to the liner 10 and the abutting surface 12bs on the flange part 12b side is abutted on the abutting surface 14s on the liner 10 side. Since the liner 10 is made of a resin while the ferrule 12 is made of a metal, when the protruding part 20 presses against the abutting surface 14s on the liner 10 side, the abutting surface 14s on the liner 10 side is deformed along a shape of the protruding part 20, thereby sealing between the protruding part 20 and the abutting surface 14s.

However, when a pressure of the gas accumulated between the liner 10 and the reinforcing layer 13 is higher than a pressure in the liner 10 by a set pressure or higher, a gap through which the gas can flow is formed between the protruding part 20 and the abutting surface 14s by deformation of the liner 10. Further, the protruding part 20 may be formed on the abutting surface 14s on the liner 10 side.

A communication hole 21 that allows a bottom portion 19b of the trap groove 19 to communicate with an end surface 12e of the ferrule main body part 12a on an outer side in the axial direction is formed in the ferrule 12. Therefore, the bottom portion 19b of the trap groove 19 communicates with the atmosphere through the communication hole 21 during manufacture of the high-pressure tank 1. Also, the communication hole 21 also functions as an injection hole for filling the inside of the trap groove 19 with a filler f (see FIGS. 4 and 5) at a final stage of manufacturing the high-pressure tank 1.

Also, the reinforcing layer 13 can be obtained by assembling the ferrule 12 to the liner 10, attaching reinforced fibers impregnated with a base resin r (see FIGS. 4 and 5) to cover across the liner 10 and an outer surface of the flange part 12b of the ferrule 12, and then curing the base resin r by a heat treatment or the like. As the base resin, for example, an epoxy-based resin or the like can be used. Also, as the reinforced fibers, for example, carbon fibers or the like can be used.

[Manufacturing Method of High-Pressure Tank 1]

The manufacture of the high-pressure tank 1 can be roughly divided into the following three steps.

(1) Step of shaping and processing the liner 10 and the ferrule 12
(2) Step of assembling the liner 10 and the ferrule 12
(3) Step of forming the reinforcing layer 13

In step (1) described above, the liner 10 is shaped into a predetermined shape using a resin material, and the discharge hole 17, the trap groove 19, the protruding part 20, the communication hole 21, and the like are formed in the ferrule 12. Also, the plug 18 is attached to an end portion of the discharge hole 17 of the ferrule 12.

Further, when the trap groove 19 and the protruding part 20 are disposed on the liner 10 side, the trap groove 19 and the protruding part 20 are integrally shaped with the liner 10.

In step (2) described above, the flange part 12b of the ferrule 12 is placed on the abutting surface 14s of the liner 10, and the connecting cylindrical part 15 of the liner 10 is connected to the supply/discharge port 11 of the ferrule 12 by screwing. Thereby, the abutting surface 12bs of the flange part 12b of the ferrule 12 is abutted on the abutting surface 14s of the liner 10.

Figure 4:
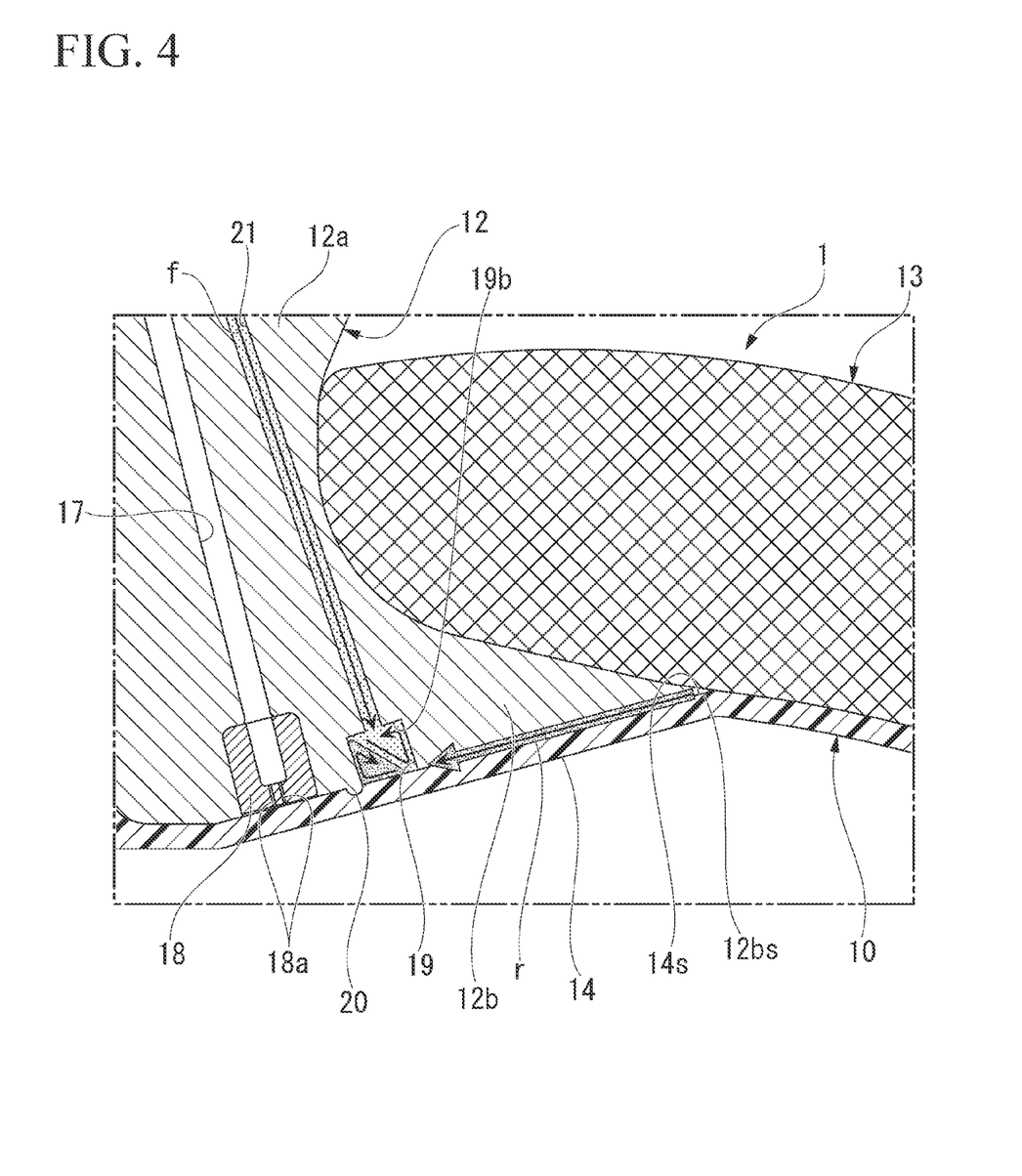
FIG. 4 is a cross-sectional view similar to FIG. 2 illustrating a state in which a base resin and a filler are flowed in during manufacturing.
Figure 5:
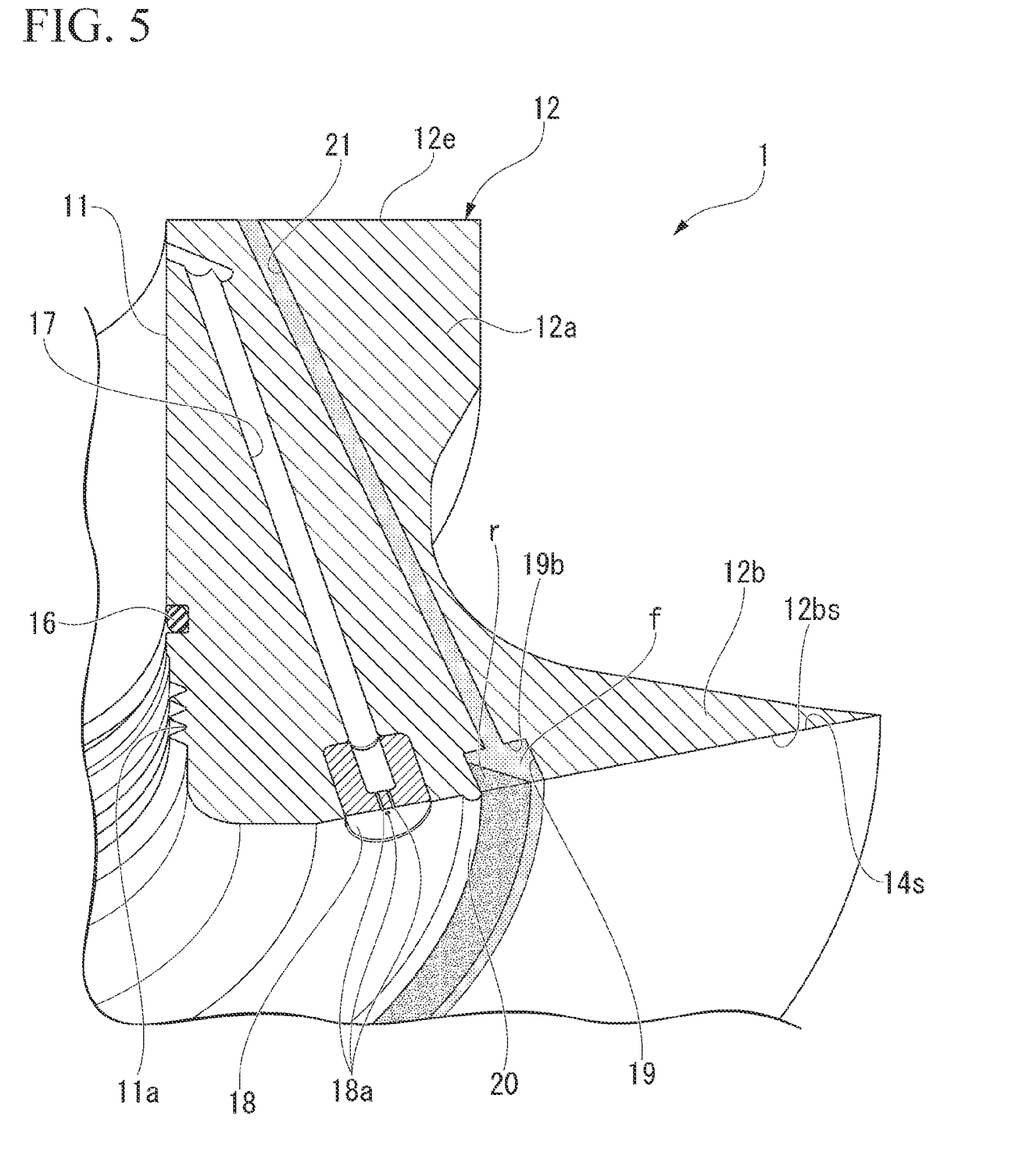
FIG. 5 is a partial cross-sectional perspective view similar to FIG. 3 illustrating a state in which the base resin and the filler are flowed in during manufacturing.

FIG. 4 is a cross-sectional view similar to FIG. 2 illustrating a state in which the base resin r and the filler f are flowed in during manufacture of the high-pressure tank 1. Also, FIG. 5 is a partial cross-sectional perspective view similar to FIG. 3 illustrating a state in which the base resin r and the filler f are flowed in during manufacture of the high-pressure tank 1.

In step (3) described above, the reinforced fibers impregnated with the base resin r is attached to cover the assembled liner 10 and ferrule 12. Further, the base resin r may be impregnated into the reinforced fibers after the reinforced fibers are wound around the liner 10 and the ferrule 12. At this time, since the reinforced fibers are attached to cover across the liner 10 and an outer circumferential surface of the flange part 12b of the ferrule 12, the base resin r in a liquid state may flow into the gap between the abutting surface 12bs on the ferrule 12 side and the abutting surface 14s on the liner 10 side as illustrated in FIG. 4.

In this way, when the base resin r flows into the gap between the abutting surfaces 12bs and 14s from the outside in a radial direction, the base resin r is trapped by the annular trap groove 19. At this time, when the base resin r tries to proceed radially inward through the gap between the abutting surfaces 12bs and 14s past the trap groove 19, the proceeding is prevented by the annular protruding part 20. As a result, the base resin r in a liquid state that has flowed into the gap between the abutting surfaces 12bs and 14s accumulates in the trap groove 19. Thereafter, when the flow of the base resin r has become stable, the filler f is filled into a space portion (a portion not completely filled with the base resin r) in the trap groove 19 from the outside of the ferrule 12 through the communication hole 21. At this time, the filler f is also filled in the communication hole 21.

Thereafter, the base resin r is cured by subjecting the base resin r to a heat treating. As a result, the reinforcing layer 13 is formed on an outer sides of the liner 10 and the ferrule 12. Also, the filler filled in the trap groove 19 and the communication hole 21 closes the trap groove 19 and the communication hole 21 by being cured.

In the high-pressure tank 1 manufactured as described above, the gap between the outer circumferential surface of the liner 10 and the reinforcing layer 13 can communicate with the inside of the supply/discharge port 11 of the ferrule 12 through the gap of the abutting portion between the liner 10 and the ferrule 12, and the discharge hole 17. Therefore, when a gas inside the liner 10 passes through the circumferential wall of the liner 10 and accumulates in the gap between the outer circumferential surface of the liner 10 and the reinforcing layer 13, and a pressure of the accumulated gas rises above a set pressure, the gas is returned into the supply/discharge port 11 of the ferrule 12 through the above-described path.

Effects of Embodiment

In the high-pressure tank 1 of the present embodiment, the trap groove 19 surrounding the circumferential region of the discharge hole 17 is provided on at least one of the abutting surface 12bs of the ferrule 12 on the flange part 12b side and the abutting surface 14s on the liner 10 side. Therefore, the base resin r in a liquid state before curing can be trapped by the trap groove 19 at the time of manufacturing the high-pressure tank 1. Therefore, when the high-pressure tank 1 of the present embodiment is employed, the base resin r can be reliably prevented from flowing into the discharge hole 17 during manufacturing while having a simple structure that is easy to manufacture.

Also, in the high-pressure tank 1 of the present embodiment, the annular protruding part 20 is formed on one of the abutting surfaces 12bs and 14s on the ferrule 12 side and the liner 10 side to surround a circumferential region of the discharge hole 17 on an inner side of the trap groove 19 and press against the other of the abutting surfaces. Therefore, when the base resin r in a liquid state has flowed into the gap between the abutting surfaces 12bs and 14s during manufacture of the high-pressure tank 1, a resin that has not been trapped by the trap groove 19 can be prevented from flowing into the discharge hole 17 side by the protruding part 20. Therefore, when the present configuration is employed, the base resin r flowing into the discharge hole 17 can be doubly prevented by the trap groove 19 and the protruding part 20.

Further, in the high-pressure tank 1 of the present embodiment, the communication hole 21 for allowing the trap groove 19 to communicate with the outside of the ferrule 12 is formed in the ferrule 12. Therefore, the trap groove 19 is open to the atmosphere through the communication hole 21, and an inflow of the base resin r into the trap groove 19 becomes smooth at the time of manufacturing the high-pressure tank 1. Therefore, when the present configuration is employed, the base resin r in a liquid state flowing into the discharge hole 17 side without being accumulated in the trap groove 19 can be suppressed.

Also, in the case of the present configuration, the filler f can be filled into the trap groove 19 from the outside of the ferrule 12 through the communication hole 21 at the time of manufacturing the high-pressure tank 1. Therefore, when the resin liner 10 receives a high pressure of the gas therein in use of the high-pressure tank 1, the liner 10 can be prevented from being deformed to enter the space portion of the trap groove 19 beforehand. Therefore, when the present configuration is employed, deterioration of the liner 10 can be prevented, and durability of the high-pressure tank 1 can be enhanced.

Other Embodiment 1

Figure 6:
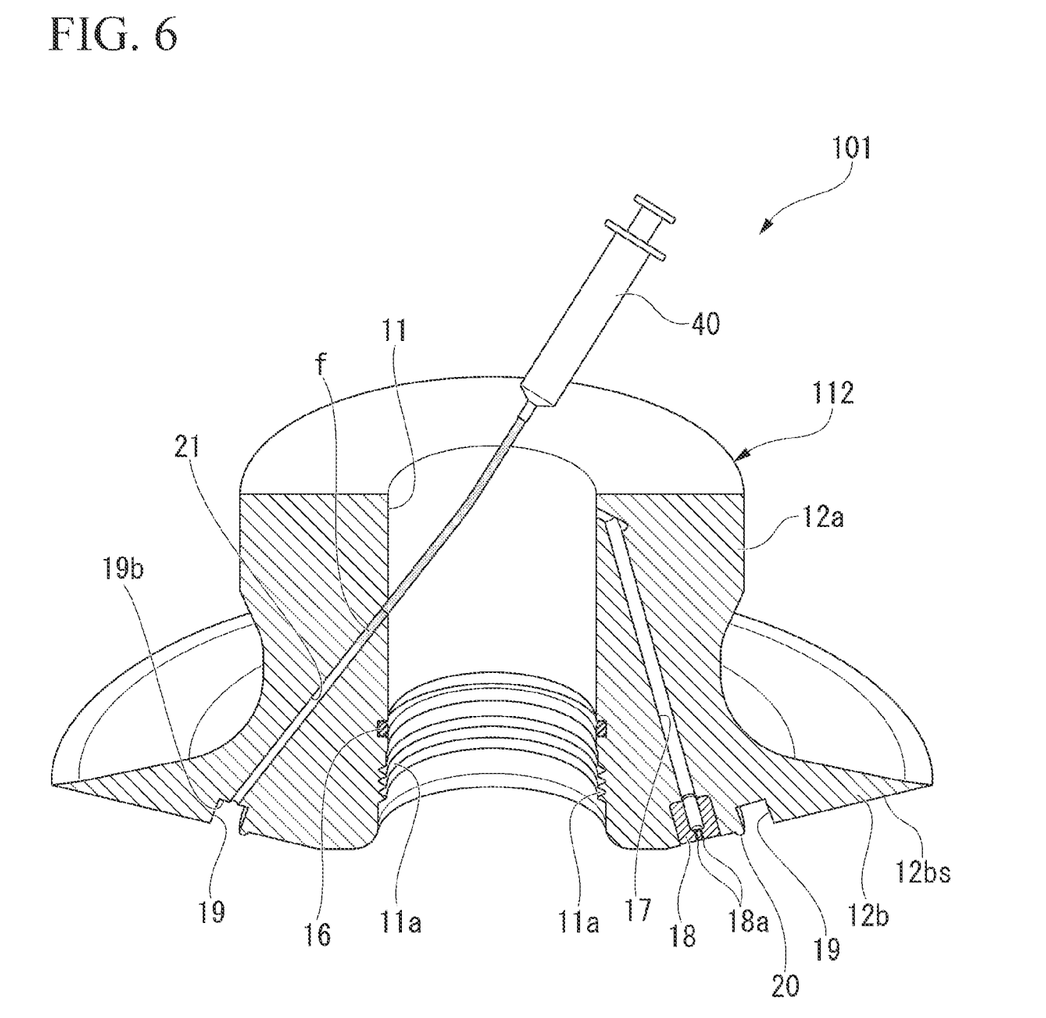
FIG. 6 is a partial cross-sectional perspective view of a ferrule of other embodiment 1.

FIG. 6 is a partial cross-sectional perspective view of a ferrule 112 portion of a high-pressure tank 101 of other embodiment 1.

The high-pressure tank 101 of the present embodiment is slightly different from the above-described embodiment in a part of a structure of the ferrule 112.

The ferrule 112 of the present embodiment is different from the above-described embodiment in a position at which a communication hole 21 for allowing a trap groove 19 to communicate with the outside of the ferrule 112 is formed while the basic configuration is substantially the same as that of the above-described embodiment. Specifically, one end side of the communication hole 21 communicates with a bottom portion 19b of the trap groove 19 at a position separated from the discharge hole 17 in a circumferential direction of the ferrule 112. Also, the other end side of the communication hole 21 communicates with an inner surface of the supply/discharge port 11 instead of an end surface of the ferrule 112 in an axial direction.

In the case of the high-pressure tank 101 of the present embodiment, when the trap groove 19 is filled with a filler f during manufacturing, for example, a distal end portion of a filling device 40 is inclined and inserted into the communication hole 21, and in that state, the communication hole 21 and the trap groove 19 are filled with the filler f. Thereby, the communication hole 21 and the trap groove 19 are closed by the filler f, and the same effects as those of the above-described embodiment can be obtained.

However, in the case of the present embodiment, since the end portion of the communication hole 21 communicates with the inner surface of the supply/discharge port 11, it is possible to obtain a further effect that the communication hole 21 and the filling portion of the filler f are not visually noticeable from the outside and the commercial value is enhanced.

Other Embodiment 2

Figure 7:
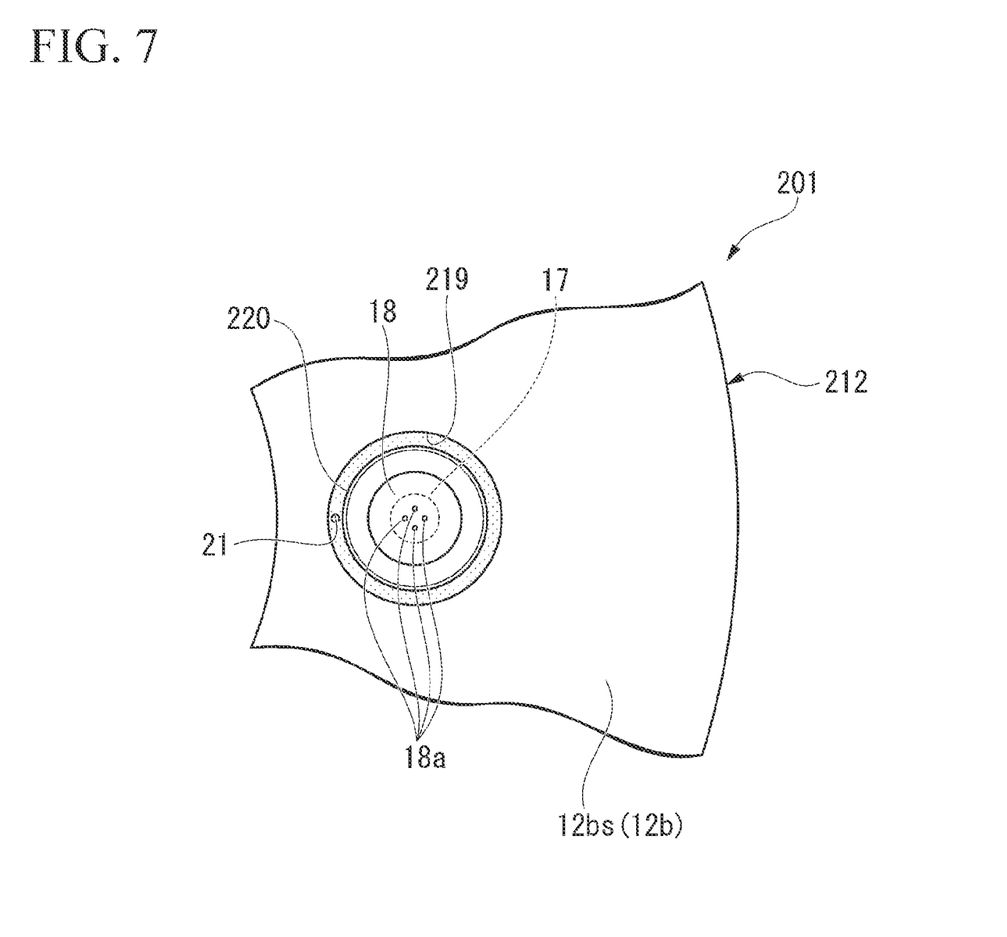
FIG. 7 is a bottom view of a part of a ferrule of other embodiment 2.

FIG. 7 is a view of a part of a ferrule 212 of a high-pressure tank 201 of other embodiment 2 from a lower surface side (an abutting surface 12bs side of a flange part 12b).

In the above-described embodiment, the trap groove and the protruding part are formed on the flange part to draw a circular shape with the axis of the liner as a center, but in the present embodiment, a trap groove 219 and a protruding part 220 are formed on the abutting surface 12bs of the flange part 12b to draw a circular shape with a center of an end portion of a discharge hole 17 as a center.

Also in the case of the present embodiment, a base resin that has flowed into the gap between the liner and the abutting surface 12bs of the ferrule 212 can be prevented from flowing in a direction of the discharge hole 17 by the trap groove 219 and the protruding part 220 at the time of manufacturing the high-pressure tank 201.

However, in the case of the present embodiment, since diameters of the trap groove 219 and the protruding part 220 surrounding a circumferential region of the discharge hole 17 can be reduced, the processing applied to the ferrule 212 is facilitated. Therefore, when the present configuration is employed, the production efficiency of the ferrule 212 can be further improved.

Also in the case of the present embodiment, the trap groove 219 and the protruding part 220 can also be provided on the liner side. In this case, formation on the liner side is facilitated.

Further, the present invention is not limited to the embodiments described above, and various modifications can be made in design in a range not departing from the gist thereof.

What is claimed is:

1. A high-pressure tank comprising:
a resin liner constituting a hollow fluid filling part;
a ferrule including a supply/discharge port which communicates with an internal space of the liner and a flange part which protrudes outward in a radial direction from a circumferential region of the supply/discharge port and abuts on the liner; and
a reinforcing layer made of a fiber reinforced resin attached to cover across the liner and an outer circumferential surface of the flange part, wherein
a discharge hole allowing a gap between abutting surfaces of the flange part and the liner to communicate with an inside of the supply/discharge port and discharging a fluid accumulated between the liner and the reinforcing layer to the supply/discharge port is provided in the ferrule,
a trap groove surrounding a circumferential region of the discharge hole is provided on at least any one of the abutting surface of the flange part and the abutting surface of the liner,
a protruding part is formed on any one of the abutting surfaces of the flange part and the liner to surround the circumferential region of the discharge hole on an inner side of the trap groove and press against the other of the abutting surfaces,
a communication hole extending from a bottom portion of the trap groove to an end surface of the ferrule on an outer side in an axial direction, and
the communication hole and the trap groove are closed by a filler.

2. A manufacturing method of a high-pressure tank which is a method of manufacturing a high-pressure tank including:
a resin liner constituting a hollow fluid filling part;
a ferrule including a supply/discharge port which communicates with an internal space of the liner and a flange part which protrudes outward in a radial direction from a circumferential region of the supply/discharge port and abuts on the liner; and
a reinforcing layer made of a fiber reinforced resin attached to cover across the liner and an outer circumferential surface of the flange part, the manufacturing method of a high-pressure tank comprising:

a step of forming a discharge hole which allows an abutting surface of the flange part with respect to the liner to communicate with an inside of the supply/discharge port in the ferrule;

a step of forming a trap groove which surrounds a circumferential region of the discharge hole on at least any one of the abutting surface on the flange part and the abutting surface on the liner;

a step of forming a protruding part which surrounds the circumferential region of the discharge hole on an inner side of the trap groove and presses against the other of the abutting surfaces on any one of the abutting surfaces of the flange part and the liner;

a step of assembling the ferrule to the liner;

a step of attaching reinforced fibers impregnated with a base resin to cover the liner and the outer circumferential surface of the flange part of the ferrule;

a step of obtaining the reinforcing layer by curing the base resin;

a step of forming a communication hole which allows a bottom portion of the trap groove to communicate with an end surface of the ferrule on an outer side in an axial direction in the ferrule before the ferrule is assembled to the liner; and a step of filling a filler into the trap groove through the communication hole.

* * * * *